United States Patent Office 3,847,891
Patented Nov. 12, 1974

3,847,891
SEPARATION OF SECRETIN AND CHOLECYS-TOKININ-PANCREOZYMIN FROM MIXTURE THEREOF
Shinro Tachibana, Narashino, Japan, assignor to Eisai Co., Ltd., Tokyo, Japan
Filed Apr. 18, 1973, Ser. No. 352,240
Int. Cl. A61k 27/00; C07c 103/52
U.S. Cl. 260—112.5         16 Claims

ABSTRACT OF THE DISCLOSURE

Separation of secretin and cholecystokinin-pancreozymin in high purity having high intestinal hormone activity on digestive tracts from a mixture thereof by contacting an aqueous solution of the mixture under a controlled pH and/or ion-concentration with an anionic exchange resin to cause selective adsorption of cholecystokinin-pancreozymin on the resin, recovering cholecystokinin-pancreozymin from the treated resin by eluting it with another aqueous medium having pH and/or ion-concentration same or different from the former, and recovering secretin from the mother liquor by conventional means, the said mixture having been obtained by extraction of small intestine of mammal.

---

Figure 1:
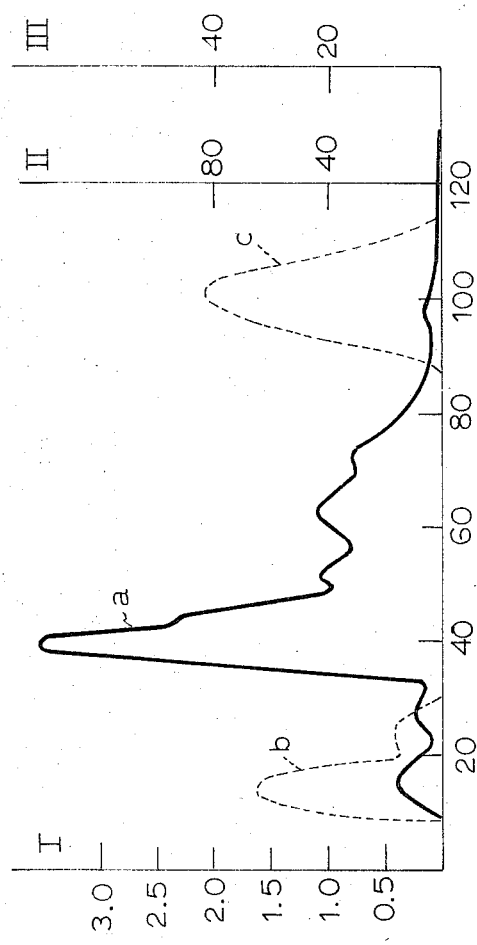

This invention relates to the separative isolation of secretin and cholecystokinin-pancreozymin in high purity from a mixture thereof. Each of the products thus separated out possesses high intestinal hormone activity on the digestive tract and is therefore useful for medical treatment and in particular for diagnosis of various diseases of pancreas and gallbladder.

A number of the methods have been provided for separation of secretin and cholecystokinin-pancreozymin hereinafter called CCK-PZ from the mixture thereof, which, for example, involved:

(a) A method for isolation of secretin from an aqueous solution of the mixture by selective adsorption of secretin on bile acid and recovery of CCK-PZ from the residual mother liquor [Journal of Physiology, *102*, 115 (1943)];

(b) Extraction of secretin from the mixture with methanol and recovery of CCK-PZ from the residue (U.S. Pat. No. 3,013,944);

(c) Extraction of secretin from the mixture with aqueous isopropanol and recovery of CCK-PZ from the residue (Japanese Patent Publication No. 89,533/70); and (d) Extraction of secretin from the mixture with n-butanol and recovery of CCK-PZ from the residue [Gastroenterology, *3*, 108 (1946)].

Even though all of these known methods are tolerably effective for separative recovery of these two substances from a mixture thereof, it was found that they are still insufficient to provide each of these substances free from the other.

It is well known that secretin essentially functions to stimulate secretion of enzyme-free pancreatic juice from the pancreas and at the same time feebly stimulates secretion of bile from the liver, while CCK-PZ essentially functions to stimulate secretion of enzyme-rich pancreatic juice from the pancreas and also bile from gallbladder.

As for gastric acid secretion, it was recently found that secretin functions reverse to CCK-PZ. CCK-PZ stimulates secretion of gastric acid, whereas secretin inhibits that of gastric acid by gastrin.

Owing to the above-mentioned different and/or reverse activities between the two intestinal hormones on the digestive tracts, there is a serious obstruction when one of these substances contaminated with the other is contemplated for utilization in medical treatment and especially for diagnosis of certain diseases of the digestive tract.

It has therefore been desired earnestly a provision of these intestinal hormones each as a single substance free from the other.

According to my thorough studies on characteristics of these intestinal hormones, it has been found that CCK-PZ is comparatively stable in an aqueous medium at pH about 9 to 10 or higher, that CCK-PZ is well adsorbed by anionic resin when CCK-PZ kept in an aqueous medium having a controlled pH falling preferably within 9 to 12 and optionally containing a relatively low ion-concentration of an electrolyte is contacted with the resin, and that CCK-PZ thus adsorbed by the resin is released when the resin is treated with (1) an aqueous medium having a pH 9 or even higher and contains a high ion-concentration; (2) an aqueous medium having pH lower than 9 and optionally in the presence of a low ion-concentration or (3) an aqueous medium at a pH lower than 9 and in the presence of a high ion-concentration. It is further surprisingly observed that secretin, like CCK-PZ, is comparatively stable in an aqueous medium at pH ranging from 8.5 to 10 or higher and that secretin is not adsorbed by the anionic exchange resin under the conditions at which CCK-PZ is adsorbed thereby.

Performance of the present invention, as will be hereinunder explicitly explained, indeed, relies upon the above observations on the peculiar characteristics of these two intestinal hormones.

According to the present invention, secretin and CCK-PZ are almost completely separated each other from their mixture by contacting the latter with an anionic resin in an aqueous medium under suitably controlled pH at which CCK-PZ is adsorbed by the resin, removing the mother liquor to recover secretin therefrom in conventional manner, and eluting CCK-PZ from the CCK-PZ carrying resin by treating with another aqueous medium under controlled pH and/or ion-concentration at which the adsorbed CCK-PZ is released from the resin.

It is to be understood that the process of the present invention can be performed by several modifications depending upon the characteristics of the anionic resin to be employed without departing from the essential feature of the invention.

In an embodiment of the invention, an aqueous solution at pH 9.0 or higher of a mixture of secretin and CCK-PZ is first poured onto a column packed with a suitable anionic exchange resin, said aqueous medium may preferably contain a relatively low ion-concentration. The effluent emerging from the column is collected to recover secretin contained therein. The column of the resin may be washed with an amount of same aqueous buffer as that used for dissolution of the starting mixture, in order to remove the residual mother liquor held on the resin. The spent liquor of the washing may be combined with the effluent previously reserved for recovery of secretin. The column is then treated with one of the aforementioned aqueous media, which are capable of releasing CCK-PZ from the resin, in order to elute said CCK-PZ.

In carrying out the separative elution of these two substances through a column of anionic resin as above mentioned, there may be utilized either the so-called gradient elution method or the stepwise elution method.

In still another embodiment of this invention, secretin and CCK-PZ are separately recovered by gradually passing a single and same aqueous eluting medium, if said medium is suitably controlled with respect to its pH around 9 and its ion-concentration. In carrying out the procedure, secretin is preponderantly recovered from the effluent fractions obtained in the beginning stages of elution, whereas CCK-PZ is recovered from the fractions obtained in the later stages of elution.

Instead of the above-mentioned isolation processes in which a column of the resin is employed, the invention may be conducted by batch process. An anionic exchange resin is thus introduced with stirring into an aqueous solution of a mixture of secretin and CCK-PZ. In order to assure a selective adsorption of CCK-PZ, said aqueous medium should have a pH 9.0 or higher and optionally contains a relatively low ion-concentration. The whole is then filtered to recover the resin. From the resin, CCK-PZ is recovered by eluting it with one of the aqueous media suitable for releasing the adsorbed CCK-PZ such as those aforementioned. On the other hand, secretin is recovered from the filtrate in accordance with a conventional procedure.

As for the mixture of secretin and CCK-PZ to be treated with the method of this invention, there may be mentioned all of the substances so far as they contain secretin and CCK-PZ, such as the extracts obtained by treating small intestine of mammal with an acid, water, organic solvent or the like as well as secretin and CCK-PZ having a certain purity such as those obtained accordance with the aforementioned known methods (a), (b), (c) and (d).

The preferred anionic exchange resins used in practice of this invention are those belonging to polystyrene resins such as Amberlite IRA 400, the trade name and sold by Rohm and Haas Company; Dowex 1, the trade name and sold by Dow Chemical Company; and cellulose derivatives for ion-exchange such as TEAE Cellulose, cross-linked dextran derivatives such as DEAE Sephadex and QAE Sephadex, the trade name and sold by Pharmacia Inc. and cross-linked dextran derivatives containing diethyl 2-hydroxylpropyl ammonium groups.

In the process of the present invention, it is notable that secretin is obtained in a pure form not contaminated with more than 0.1 percent by weight of CCK-PZ, and that CCK-PZ is obtained which is substantially not contaminated with secretin. In practice of the process of the invention by using, for example, a crude starting material which contains the two substances in considerably poor percentages, there is obtained secretin which is contaminated at the most with 0.1% of CCK-PZ, and CCK-PZ which does substantially not contain secretin.

These substances posess their outstanding characteristic hormone activities on the specific digestive tracts, and accordingly, they are particularly suitable for diagnosis and medical treatment of diseases peculiar to these organs.

The following examples will serve to illustrate the invention.

EXAMPLE 1

An amount equivalent to 80 grams of dry QAE Sephadex A–25 was activated in accordance with a usual manner, well buffered with a 0.01 molar aqueous ammonium formate at pH 9.0 and packed in a tubular column of glass having dimension of 2.5 x 90 cm.

1.9 grams of a mixture having a potency of 155 Crick, Harper and Raper units/mg. of secretin and 7.7 Ivy Dog units/mg. of CCK-PZ were dissolved in 50 ml. of distilled water. The resulting solution was made alkaline at pH 9.5 with a 0.1N aqueous ammonia and then centrifuged to remove any insoluble matter.

A clear solution thus obtained was poured onto the above-mentioned column. The column was successively developed by the process of a gradient elution using 3 liters of a 0.01 molar ammonium formate buffer solution of pH 9.0 and 2 liters of a 0.2 molar ammonium formate buffer solution of pH 8.0 at a flow rate of 80 ml./hour. Each 20 ml. of the effluent fraction of the elution were separately collected.

The characteristics of these effluent fractions are graphically delineated in the accompanying FIG. 1 wherein the numbers of the fractions are in the abscissa. In the figure, the full line $a$ shows the concentrations (the ordinate I) of peptide in the respective fractions which was measured by optical density at 280 m$\mu$ (OD 280); the dotted line $b$ shows the amounts by $\mu$l. (the ordinate II) of pancreatic juice secreted from pancreases of the rats within 25 minutes when each aliquot 20 $\mu$l. of the effluent fractions were intravenously injected; and finally the broken line $c$ shows the contractile length by mm. (the ordinate III) of gallbladders of guinea pigs when 20 $\mu$l. of each of the effluent fractions were intravenously injected to guinea pigs.

The animal experiments with regard to the determination of the rat pancreatic response and the contractility of the guinea pig gallbladder as aforementioned were carried out in accordance with the methods reported in Japanese J. Pharmacol., 21, 325 (1971) and Svensk. Farm. Tidskr., 68, 351 (1964).

In FIG. 1, each of the effluents (A) of Nos. 10 through 30 fractions inclusive shown by the dotted line $b$ exhibits the respective secretin activity, and each of the effluents (B) of Nos. 90 through 112 fractions inclusive shown by the broken line $c$ exhibits the respective contractile length effected on gallbladders of guinea pigs. The effluents (A) and (B) were separately lyophilized. The resulting dry substances were separately dissolved in a small quantity of water and then passed through a column of Sephadex G–25 in order to remove any of the accompanying salt. Each of the effluents was lyophilized. There was obtained (a) 90.1 mg. yield of the purified secretin which possess the secretin activity of 2506 Crick, Harper and Raper units/mg. and practically free from CCK-PZ, that is, the product exhibited weak CCK-PZ activity of less than 0.1 Ivy Dog units/mg. The amount of said 90.1 mg. of the substance equals a 75% recovery of the initial content of secretin in the starting mixture; and (b) 67.5 mg. yield of the CCK-PZ which possess the CCK-PZ activity of 83 Ivy Dog units/mg. with no secretin activity. The amount of 67.5 mg. of the substance is equivalent to a 83% recovery of the initial content of CCK-PZ in the starting mixture.

EXAMPLE 2

An amount equivalent to 10 grams of dry TEAE Cellulose was activated in accordance with a usual manner, thoroughly buffered with a 0.005 molar aqueous ammonium formate at pH 9.0 and washed thoroughly with water. The substance was then packed in a tubular column of glass having dimensions of 1.5 x 30 cm.

100 mg. of a mixture of secretin and CCK-PZ having a potency of 339 Crick, Harper and Raper units/mg. of secretin and 10 Ivy Dog units/mg. of CCK-PZ were dissolved in 5 ml. of distilled water. The resulting solution was made alkaline at pH 9.5 with a 0.1N aqueous ammonia and centrifuged to remove any insoluble matter.

The clear solution thus obtained was poured onto the above-mentioned column. The column was first developed with 300 ml. of a 0.005 molar aqueous ammonium formate buffer solution of pH 9.0 and after 18 hours with 180 ml. of a 0.02 molar aqueous ammonium formate buffer solution of pH 9.0, and after further 12 hours with 100 ml. of a 0.2 molar aqueous ammonium formate buffer solution of pH 9.0, each at the flow rate of 15 ml./hour. Each 5 ml. of the effluent fraction of the elution were separately collected.

Figure 2:
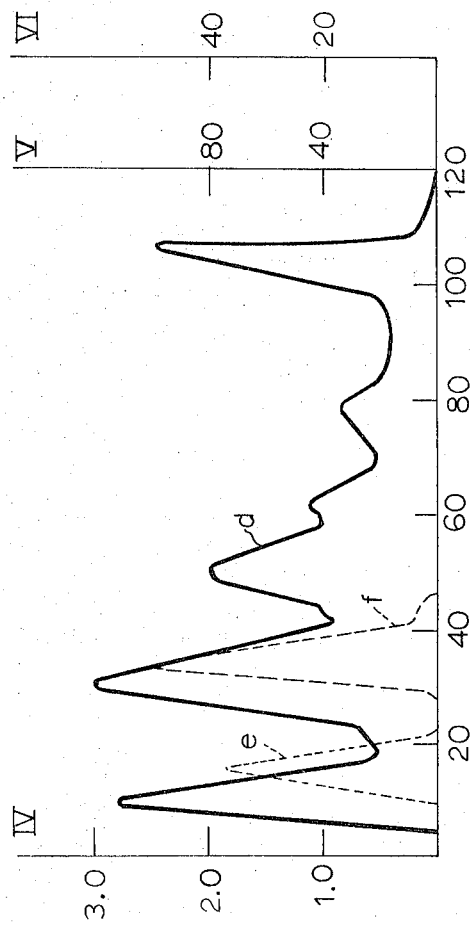

The characteristics of the effluent fractions are graphically delineated in accompanying FIG. 2. In the figure, the numbers of fractions are shown in abscissa and the full line $d$ shows the concentrations by percent (the ordinate IV) of peptide in each of the corresponding fractions, which were measured by optical density at 225 mμ (OD 225); the dotted line *e* shows the amounts by μl. (the ordinate V) of pancreatic juice secreted within 25 minutes from pancreas of rats when 20 μl. of said respective effluent fractions were intravenously injected into the animals; and finally the broken line *f* shows the contractile length by mm. (the ordinate VI) of gallbladder of guinea pigs when 40 μl. of said respective effluent fractions were intravenously injected to the animals. The animal experiments with regard to the secretion of pancreatic juice and the contractile length of gallbladder as aforementioned were conducted in accordance with the methods reported in Japanese J. Pharmacol. *21*, 325 (1971) and Svensk. Farm. Tidskr., *68*, 351 (1964).

The combined effluents of Nos. 10 through 20 fractions inclusive in FIG. 2, which show the secretin activity represented by the dotted line *e*, and the combined effluents of Nos. 30 through 42 fractions inclusive which possess the contractile potency of gallbladder shown by the broken line *f*, were separately lyophilized.

There were obtained 10.5 mg. and 8.7 mg. of the two dry substances. The former possess secretin activity of 2230 Crick, Harper and Raper units/mg. and the latter possess the CCK-PZ activity of 101 Ivy Dog units/mg.

It was further confirmed that the two substances were contaminated with each other only in an extent of approximately 1/2000 part by weight or less. The above-mentioned 10.5 mg. of the substances amount to a 70% and an 88% recoveries of the initial secretin and CCK-PZ activities in the starting mixture.

EXAMPLE 3

An amount equivalent to 70 grams of dry QAE Sephadex A-25, a commercially available quaternary anionic exchange resin sold by Pharmacia Inc., was activated in a conventional procedure, and thoroughly buffered with a 0.01 molar aqueous ammonium formate at pH 9.0. The activated resin was packed in a column of 2.5 x 100 cm. dimension, and 200 ml. of a 0.01N aqueous ammonia were passed through the column.

5 grams of a mixture of secretin and CCK-PZ having a potency of 12 Crick, Harper and Raper units/mg. of secretin and 0.5 Ivy Dog units/mg. of CCK-PZ were dissolved in 200 ml. of distilled water. The resulting solution was made alkaline at pH 9.0 with a 0.5N aqueous ammonia and centrifuged to remove any of insoluble matters.

The clear solution thus obtained was poured onto the abovementioned column. The column was successively developed by means of gradient elution using 2 liters of a 0.01 molar aqueous ammoniumformate buffer solution of pH 9.0 and 2 liters of a 0.01 molar aqueous ammonium formate buffer solution of pH 7.0 at a flow rate of 60 ml./hour. Each 10 ml. of the elution was separately collected.

Figure 3:
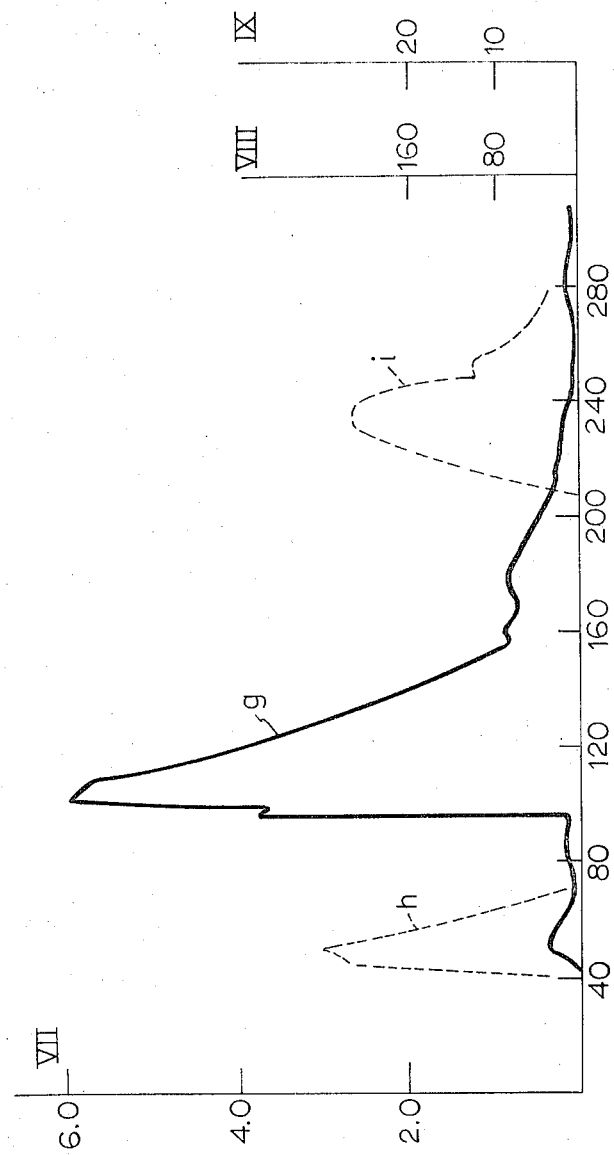

The characteristics of the recovered fractions are graphically delineated in accompanying FIG. 3 wherein the numbers of fractions are shown in abscissa.

In FIG. 3, the full line *g* shows the concentrations by percent (the ordinate VII) of peptide contained in the corresponding effluent fractions which were measured by means of optical density at 280 mμ; the dotted line *h* shows amounts by μl. (the ordinate VIII) of the pancreatic juice secreted within 25 minutes from the pancreases of the rats when each 100 μl. of the corresponding effluent fractions were intravenously injected to the animals, and the broken line *i* shows the contractile length by mm. (the ordinate IX) of guinea pig gallbladders when each 100 μl. of the corresponding effluent fractions were intravenously injected into the animals.

The abovementioned animal experiments with regard to the secretion of pancreatic juice and the contractility of gallbladder of the animals were conducted in accordance with the methods reported in Japanese Pharmacol., *21*, 325 (1971) and Svensk. Farm. Tidskr., *68*, 351 (1964).

The effluents of Nos. 48 through 70 fractions inclusive showing the secretin activities as represented by the dotted line *h* and the effluents of Nos. 212 through 264 fractions inclusive showing the contractile activity on gallbladders as represented by the broken line *i* were separately gathered together. Each of the gathered fractions was acidified at pH 3.5 with 3N-HCl and the solutions were salted out with NaCl at a full saturation. Each of the resultant precipitates was dissolved again in a small quantity of water and further worked up in accordance with the procedures given in Example 1 in order to remove the accompanying salts.

There were obtained (a) 49.4 mg. of the secretin which possess the secretin activity of 911 Crick, Harper and Raper units/mg. and at the same time the CCK-PZ activity of 0.3 Ivy Dog units/mg. The amount equals a 75 percent recovery of the initial content of secretin in the starting mixture; and (b) 40 mg. of the CCK-PZ which possess the CCK-PZ activity of 45 Ivy Dog units/mg. with no secretin activity. The amount equals a 72 percent recovery of the initial content of CCK-PZ in the starting mixture.

What is claimed is:

1. A process for the separation of secretin and cholecystokinin-pancreozymin from a mixture thereof, comprising
   (a) contacting the mixture in aqueous solution at a pH ranging from about 9 to about 12, with an anion-exchange resin to cause selective adsorption of cholecystokinin-pancreozymin on said resin and reserving the remaining aqueous solution;
   (b) eluting the cholecystokinin-pancreozymin from said resin by contacting it with an aqueous eluting medium at pH lower than 9: and
   (c) recovering the cholecystokinin-pancreozymin from the eluate of step (b) and recovering the secretin from the aqueous solution obtained from step (a), which solution contains the secretion not adsorbed by said resin.

2. A process as claimed in claim 1 wherein the aqueous solution of step (a) further contains a water-soluble electrolyte.

3. A process as claimed in claim 1 wherein the resin of step (a) is a styrene, cellulose or cross-linked dextran.

4. A process as claimed in claim 1, wherein steps (a) and (b) are carried out in order in a common column packed with said anion-exchange resin.

5. A process as claimed in claim 1, wherein step (b) is conducted by means of the gradient elution method.

6. A process as claimed in claim 1, wherein step (b) is carried out by a stepwise batch system elution method.

7. A process as claimed in claim 3, wherein an anion-exchange resin employed in step (a) is a cross-linked dextran.

8. A process as claimed in claim 7, wherein the anion-exchange resin is a cross-linked dextran, some of the hydroxyl groups thereof being substituted by diethyl-2-hydroxypropyl ammonium ethyl groups.

9. A process according to claim 1, wherein the recoveries of the cholecystokinin-pancreozymin and secretin in step (c) are performed by lyophilization.

10. A process according to claim 2, wherein the recoveries of the cholecystokinin-pancreozymin and secretin in step (c) are performed by lyophilization.

11. A process according to claim 3, wherein the recoveries of the cholecystokinin-pancreozymin and secretin in step (c) are performed by lyophilization.

12. A process according to claim 4, wherein the recoveries of the cholecystokinin-pancreozymin and secretin in step (c) are performed by lyophilization.

13. A process according to claim 5, wherein the recoveries of the cholecystokinin-pancreozymin and secretin in step (c) are performed by lyophilization.

14. A process according to claim 6, wherein the recoveries of the cholecystokinin-pancreozymin and secretin in step (c) are performed by lyophilization.

15. A process according to claim 7, wherein the recoveries of the cholecystokinin-pancreozymin and secretin in step (c) are performed by lyophilization.

16. A process according to claim 8, wherein the recoveries of the cholecystokinin-pancreozymin and secretin in step (c) are performed by lyophilization.

References Cited
UNITED STATES PATENTS 3,013,944   12/1961   Jorpes et al. _____ 260—112.5

OTHER REFERENCES

Jorpes: *Gastroenterology,* 55, 157–64 (1968).

LEWIS GOTTS, Primary Examiner

R. J. SUYAT, Assistant Examiner

U.S. Cl. X.R.

424—104, 177